United States Patent
Zhou

(10) Patent No.: US 7,715,824 B2
(45) Date of Patent: May 11, 2010

(54) SYSTEM FOR IDENTIFYING MOBILE TERMINAL DEVICE AUTOMATICALLY AND VALUE ADDED SERVICE ACCESS

(75) Inventor: Wenwei Zhou, Hangzhou (CN)

(73) Assignee: Hangzhou Easycomm Technolog Co., Ltd., Hangzhou (CN)

( * ) Notice: Subject to any disclaimer, the term of this patent is extended or adjusted under 35 U.S.C. 154(b) by 820 days.

(21) Appl. No.: 10/569,213

(22) PCT Filed: Feb. 19, 2004

(86) PCT No.: PCT/CN2004/000132

§ 371 (c)(1),
(2), (4) Date: May 9, 2006

(87) PCT Pub. No.: WO2005/020603

PCT Pub. Date: Mar. 3, 2005

(65) Prior Publication Data

US 2006/0293036 A1 Dec. 28, 2006

(30) Foreign Application Priority Data

Aug. 26, 2003 (CN) .................................. 03 1 53875

(51) Int. Cl.
*G06F 15/16* (2006.01)
*H04M 3/00* (2006.01)

(52) U.S. Cl. ............... 455/412.1; 455/415; 455/419; 455/450; 455/517; 370/312; 370/392; 726/26

(58) Field of Classification Search ............ 455/412, 455/415, 419, 450, 517, 466; 370/312, 392; 726/26; 709/204

See application file for complete search history.

(56) References Cited

U.S. PATENT DOCUMENTS

| 7,254,398 | B2 * | 8/2007 | Patenaude | 455/450 |
| 7,317,697 | B2 * | 1/2008 | Lewis et al. | 370/312 |
| 7,359,723 | B2 * | 4/2008 | Jones | 455/466 |

(Continued)

FOREIGN PATENT DOCUMENTS

CN 1223061 7/1999

(Continued)

*Primary Examiner*—William D Cumming
(74) *Attorney, Agent, or Firm*—Calfee, Halter & Griswold LLP

(57) ABSTRACT

An automatic identification system of mobile terminal equipment, which consists of the mobile terminal equipment, mobile network communication platform and mobile terminal equipment service center. The mobile terminal equipment is provided with subscriber information handling means for transmitting terminal subscribers information to mobile terminal service center through communication channels of the mobile network communication platform. The mobile terminal equipment service center compares the terminal subscriber information with that in its database and then identifies and processes said terminal subscribers information. The terminal subscriber information includes the electronic serial number, terminal subscriber ID identification, terminal software version number and any one or any combination of two or more of the followings: network ID identification, base station number, short message center number Email address, LP internet protocol address and the information of registration place in subscriber identification card.

16 Claims, 4 Drawing Sheets

U.S. PATENT DOCUMENTS

| | | | |
|---|---|---|---|
| 2003/0095550 A1* | 5/2003 | Lewis et al. | 370/392 |
| 2003/0096600 A1* | 5/2003 | Lewis et al. | 455/412 |
| 2003/0096605 A1* | 5/2003 | Schlieben et al. | 455/419 |
| 2003/0109271 A1* | 6/2003 | Lewis et al. | 455/517 |
| 2003/0158897 A1* | 8/2003 | Ben-Natan et al. | 709/204 |
| 2006/0135170 A1* | 6/2006 | Patenaude | 455/450 |
| 2006/0293036 A1* | 12/2006 | Zhou | 455/415 |
| 2008/0098483 A1* | 4/2008 | Bhansali et al. | 726/26 |

FOREIGN PATENT DOCUMENTS

| | | |
|---|---|---|
| CN | 1395407 | 2/2003 |
| GB | 2308277 | 6/1997 |

\* cited by examiner

SYSTEM FOR IDENTIFYING MOBILE TERMINAL DEVICE AUTOMATICALLY AND VALUE ADDED SERVICE ACCESS

CROSS REFERENCE TO RELATED APPLICATIONS

The present application is the U.S. national phase entry of PCT/CN2004/000132 with an international filing date of Feb. 19, 2004 and claims priority from CN Patent Application Serial No. 03153875.4, filed Aug. 26, 2003, which are both incorporated by reference in their entirety.

FIELD OF THE INVENTION

The present invention relates to a method for a mobile terminal equipment service center to identify mobile terminal equipment, which is a technology mainly used in wireless mobile terminal equipment to provide personalized value-added services for different terminals.

DESCRIPTION OF THE RELATED ART

Currently, for most domestic and abroad mobile terminal equipment (including terminal handset and other wireless mobile equipment), subscribers are identified with a SIM (subscriber identification module)/UIM (user identification module) card in the mobile terminal by the mobile network system, while the mobile terminal equipment itself is not simultaneously identified and used. The existing wireless network system equipment is unable to identify the mobile terminal equipment.

With the development of wireless bandwidth technology and hardware manufacture technology, especially 2.5G and 3G terminals, mobile terminal equipment is not restricted merely to functions of voice, message and WAP (wireless application protocol). Many personalized, intelligent mobile terminal equipment are ceaselessly developed, such as camera handsets, securities handsets, IP (internet protocol) handsets, video handsets', communication function-built GPS (global position system) terminals and intelligent PDAs. If the functions and models of mobile terminal equipment are not identified, it is difficult to actively provide some mobile terminal equipment subscribers personalized services, including on-line handset diagnosis, synchronous on-line upgrade of a given type of terminal software, downloading of MP3 ringing tones and movies, advertising, on-line gaming, and anti-thief of mobile terminal equipment.

With personalized and intelligent functions of mobile terminal equipment, more and more subscribers wish to get new personalized value-added services from future mobile terminal equipment. Most of the current value-added services are provided through subscription or registration of specific contents by the subscribers according to the model of the mobile terminal equipment used, and the subscription is generally done through the internet due to complex operations. It is impossible for the operators and value-added services providers to actively provide the subscribers corresponding value-added services, since it is impossible for the operators to simultaneously know the subscribers' electronic serial number (the model of mobile terminal equipment), the terminal subscribers' ID (identification), the network ID (identification), the short message center number, and the information of the registration place in subscribers' identification card. Therefore it is impossible for the operators to utilize such information. If the above-mentioned problems are solved, the terminal providers will develop much more diversified and personalized mobile terminal equipment and provide perfect post-sales services; and the value-added services providers will provide professional personalized services and market management, and thus they promote the entire mobile market.

SUMMARY OF THE INVENTION

The present invention is intended to provide an automatic identification system of mobile terminal equipment to solve the existing technical problems. The automatic identification system communicates with mobile terminal equipment through a mobile terminal equipment service center to identify the mobile terminal equipment and subscribers, manage them in real time, and provide personalized value-added services.

To solve the above-mentioned problems, the following technical solution is adopted. The automatic identification system of mobile terminal equipment consists of the mobile terminal equipment, mobile network communication platform and mobile terminal equipment service center. The mobile terminal equipment should be loaded with a terminal subscriber information transmission software package, which automatically, manually or regularly transmits the terminal subscribers' information to the mobile terminal service center in forms of data, SMS (short message service), MMS (multimedia messaging service), EMS (electronic mail system), USSD (unstructured supplementary service data), WEB, WAP (wireless application protocol), E-mail, bluetooth, infrared, internet, wireless internet, TCP/IP (internet protocol) or IrDA (Infrared Data Association) protocol through a service channel, a signaling channel or an auxiliary channel of the mobile network communication platform. The mobile terminal service center compares the terminal subscriber information with that in its database and then identifies and processes said terminal subscribers information. The mentioned terminal subscriber information includes any one or any combination of two or more of the followings: the electronic serial number, terminal subscriber ID (identification), network ID (identification), base station number, short message center number, and the information of registration place in subscriber identification card. The electronic serial number of mobile terminal equipment includes the followings:

International mobile phone equipment identity is the unique code of the electronic equipment, i.e. IMEI (International Mobile Equipment Identity) of GSM (Global System for Mobil) and ESN (Electronic Serial Number) of CDMA (code division multiple access), the unique electronic number of product, and it denotes the type, technical features and ex-work serial number of the mobile terminal equipment.

The electronic number set by mobile terminal service center is the unique code of electronic equipment and denotes the type, technical features and ex-work serial number of the mobile terminal equipment.

The electronic number set by enterprise is the unique code of the electronic equipment and denotes the type, technical features and ex-work serial number of the mobile terminal equipment.

The existing software of the mobile terminal equipment will be loaded with a software package, which is capable of reading or automatically writing the terminal subscriber information of the mobile terminal equipment itself and transmitting the subscriber information to the special service number of the mobile terminal equipment service center. When the power is on or under specific conditions, the mobile terminal equipment transmits the mobile terminal equipment electronic serial number through network operators' communication platform to the mobile terminal equipment service center and to special service numbers set by the mobile terminal equipment. There may be one or more special service number and each special service number corresponds to one local public mobile network number (PLMN), internet address or E-mail address, which is assigned by local mobile operators. The special service number may be modified, added or deleted by the mobile terminal equipment service center through the mobile network.

When the power is on or under specific conditions, the mobile terminal equipment may start the transmission software package and after the software package issues a transmission command, it will automatically detect the SIM (subscriber identification module)/UIM (user identification module) card and compare the SIM (subscriber identification module)/UIM (user identification module) number or terminal phone with those of the last transmission in terminal memory unit. If the detected SIM (subscriber identification module)/UIM (user identification module) is different from the last one transmitted, the software will automatically transmit the terminal subscriber information of the mobile terminal equipment and store the transmitted SIM (subscriber identification module)/UIM (user identification module) card information in mobile terminal memory unit. Then the mobile terminal software detects the local public mobile network number PLMN (i.e. mobile country code and mobile network code, also called network ID (identification)) or the base station number, and compares them with the public mobile network code stored in mobile terminal equipment. If there is no such mobile network code in the terminal, the mobile terminal software will not transmit the terminal subscriber information, and if there is, the software package will transmit the terminal subscriber information to the mobile terminal service center of the corresponding special service number based on the local public mobile network code PLMN or the base station number legally used.

The mentioned mobile terminal equipment, also called mobile station, refers to mobile telecom terminal equipment of various systems and standards (GSM Global System for Mobil/GPRS/EDGE/WCDMA/CDMAIS95/CDMA1XRTT/CDMA2000/TD-SCDM A) such as handsets, PDAs, dual-mode handsets, group mobile phones, local wireless telephones, PHS terminals, IP (internet protocol) handsets, mobile telecom function-built GPS (global position system) terminals, portable computers, vehicle-carried computers, as well as the 3C electronic consumer products and household electric appliances providing wired or wireless communication connections for the above-mentioned terminal equipment.

The mobile terminal equipment is equipped with a software package which transmits terminal subscriber information when the mobile terminal equipment is powered on. The software package may work automatically or regularly without activation, or work only after registration and activation by the mobile terminal service center, or may be manually operated by the terminal subscriber at any time. The subscriber manual-operated software package may be in form of commands embedded into the terminal's human-machine interface and the subscriber sets the short message number or special service number for receiving the terminal subscriber information. In case the information fails to transmit to the mobile terminal service center due to incorrect setting, the mobile terminal equipment will make proper prompts.

The present invention also provides a mobile terminal equipment value-added services access system. The mobile terminal equipment service center has one or more special service numbers used to communicate with the mobile terminal equipment according to protocols, registers the terminal and subscribers, and stores them in a database for providing of corresponding value-added services. The mobile terminal equipment service center is also provided with an information reception/transmission interface, information processing equipment and software, and information storage database equipment and software with built-in value-added service contents, which is connected with related value-added service providers through interface configuration or connected with EIR (equipment identity register) and HLR\AUC of the network operators system to exchange information, process the information, and store the information in the database that is used as access platform for value-added services providers or is provided directly to the value-added services.

The mobile terminal transmits the information to the special service number of mobile terminal equipment service center and the mobile terminal equipment service center simultaneously receives information from or transmits information to multiple mobile terminal equipment.

According to a protocol format, the information processing software retrieves the terminal subscriber information from the received information sent by the mobile terminal equipment, compares the information with that in mobile terminal equipment service center database, and compares and processes the corresponding data in the database. For the processed data, the database management software optimizes the management and storage of the valid data according to the requirements and structure, extracts or processes the historical data, connects to a database, or transmits a command, application software, services and related information individually or in a group, through the mobile network communication platform to the mobile terminal equipment according to the requirements of mobile network operators, mobile equipment terminal providers or other value-added services providers. The mentioned terminal subscriber information includes any one or any combination of two or more of the followings: electronic serial number, terminal subscriber identity code, network ID (identification), short message center number and information of registration place in subscriber identification card.

The mobile terminal service center compares the received terminal subscriber information with the corresponding data in the database and notifies the suspicious subscribers in forms of data, SMS (short message service), MMS (multimedia messaging service), EMS (electronic mail system) or voice.

Compared with the prior art technology, the present invention has the advantage that even when conditions necessary for EIR (equipment identity register) services are unavailable for network operators, the operators or other enterprises may still obtain information of the mobile terminal equipment and phone number by loading software in terminal equipment and establishing a mobile terminal equipment service center. Moreover, the present invention is wider in service range, more flexible in application and lower in cost than EIR (equipment identity register). The information enables mobile terminal equipment providers to provide quality tracing, on-line upgrades, and personalized value-added services for its products. It not only solves the problem of mobile terminal equipment identification, but also reduces network operators' investment in new equipment and system software upgrades necessary for EIR (equipment identity register) services, and solves the problems of unreliable operation during upgrade of network equipment software and huge investments in capital and human resources. On the contrary, the mobile network operators can earn short message fees or other communication fees through implementing the present invention. With subscriber-related information, the mobile terminal equipment providers may develop personalized functional products as per market demands, send the information on upgrades of terminal product software and advertisements to the subscribers at any time, provide better services, stabilize subscribers and earn income on value-added services. Hence, the terminal manufacturer may directly communicate with subscribers at any time, collect market information, optimize its products and increase sales volume.

DETAILED DESCRIPTION OF THE INVENTION

Embodiment 1

The automatic identification system of mobile terminal equipment consists of the mobile terminal equipment, a mobile network communication platform, and a mobile terminal equipment service center. The mobile terminal equipment is loaded with a terminal subscriber information transmission software package. The software package may include modules to automatically transmit terminal subscriber information, modules to regularly transmit terminal subscriber information, activation registration modules, special service number modification modules, and software upgrade modules. These modules may work independently or jointly as per user requirements. It is intended the combined required information be transmitted to the mobile terminal equipment service center to help manufacturers, operators and content providers in solving their problems in management, business and meeting customers' demands due to lack of the knowledge of the model of mobile terminal equipment, the subscribers number, subscriber's equipment-purchase time, and equipment's running state.

Figure 1:
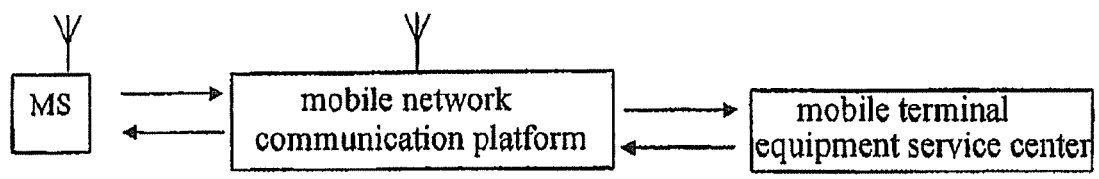
FIG. 1 is a schematic block diagram of the identification system.
Figure 2:
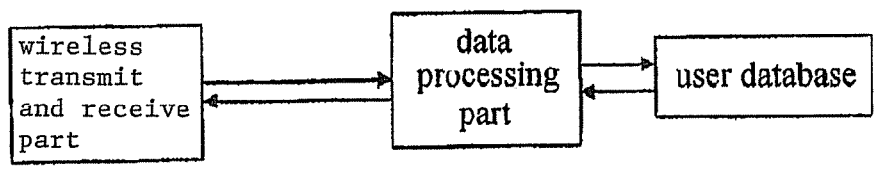
FIG. 2 is a schematic block diagram of the mobile terminal equipment service center.
Figure 3:
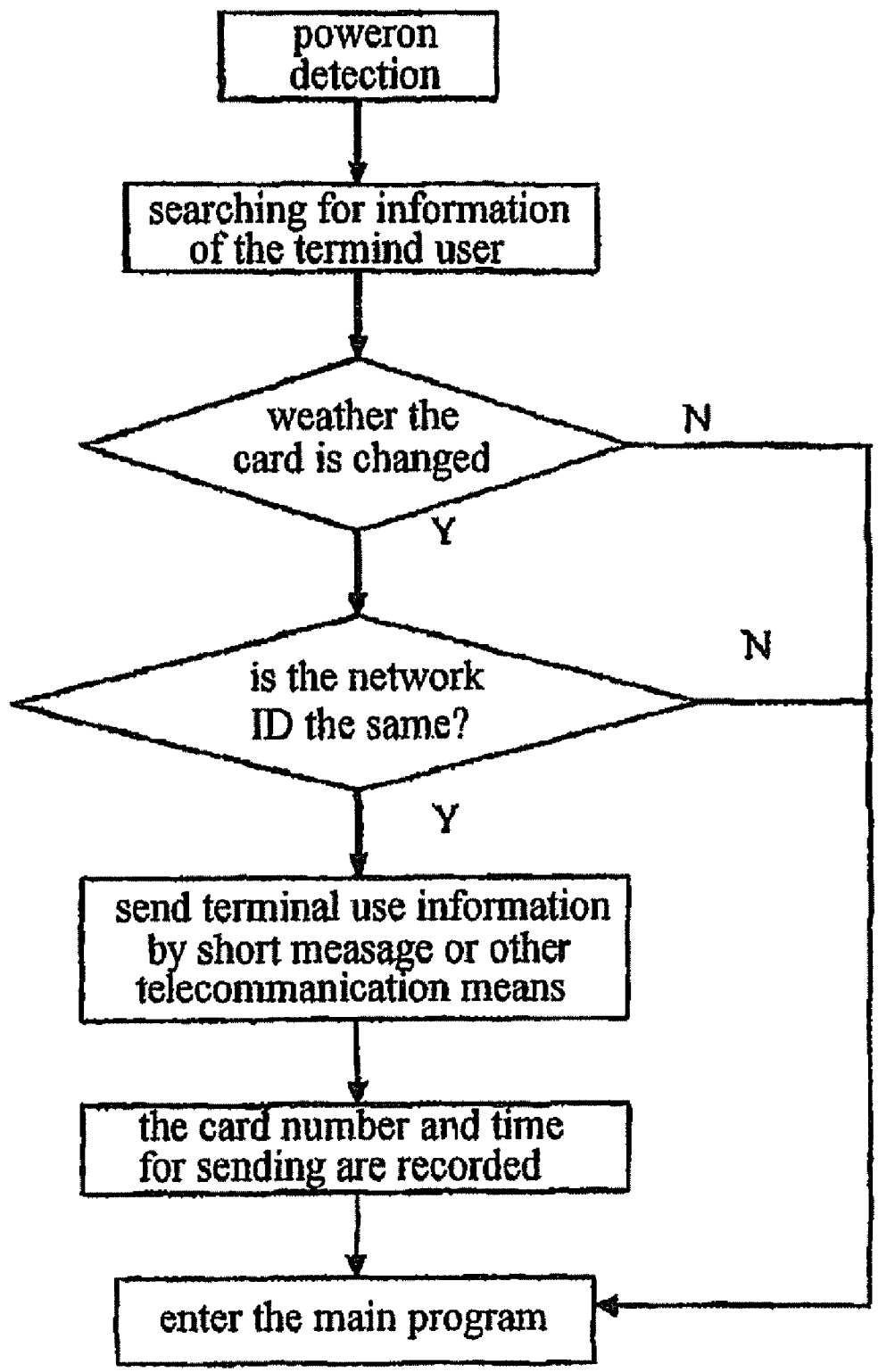
FIG. 3 is the flow chart of card-change transmission software of mobile terminal.

After a subscriber purchases a new handset, when it is powered on, the automatic terminal subscriber information transmission module of the terminal subscriber information transmission software package will read or automatically write the terminal subscriber information, and check to determine whether the handset is equipped with another subscriber identification card. If the card has not changed, it will return to the main program. If the card is changed or the information stored in the original handset is not recorded, the program will check if the network ID (identification) set in the handset is in conformity with that of its registration area. In case of discrepancy, it will return to the main program. In case of conformity, it will transmit the terminal subscriber information in the form of a short message or other communication mode, and store the transmitted information (e.g. subscriber identification card) and the transmission time in handset's memory unit for next time automatic inquiry is preferred, as shown in FIG. 3. The mentioned terminal subscriber information includes any one or any combination of two or more of the followings: electronic serial number, terminal subscriber identity code, network ID (identification), short message center number and information of registration place in subscriber identification card.

Figure 4:
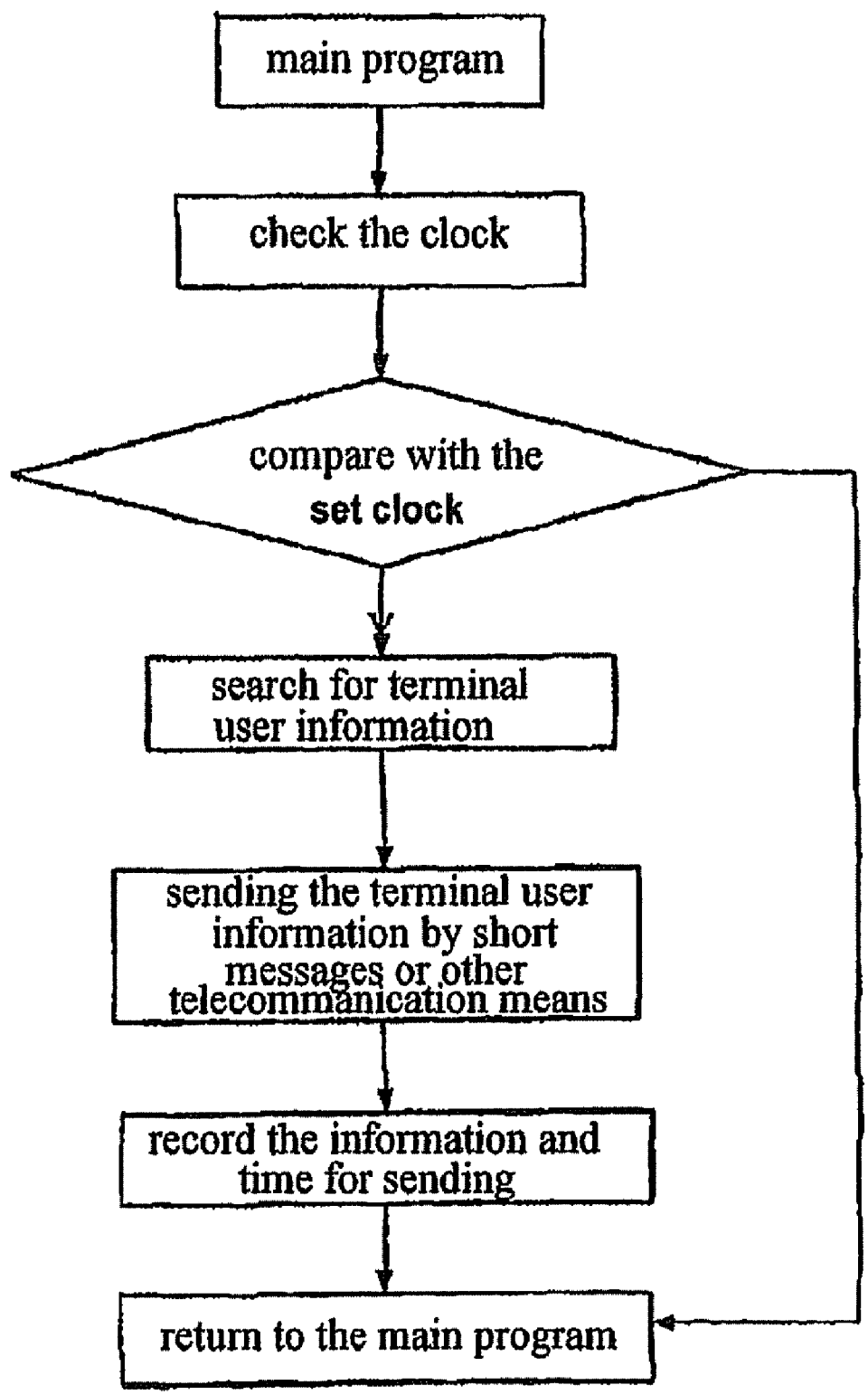
FIG. 4 is the flow chart of scheduled transmission software of a mobile terminal.

During continuous normal use of the handset, the software in the regular information transmission software module has a regular transmission function, i.e. it queries and compares the regular-transmission time previously set in handset's main program with current time. In case of nonconformity, it will return to the main program. In case of conformity it will read or automatically write the terminal subscriber information, in the form of a short message or other communication mode, transmit terminal subscriber information, and store the transmitted information (e.g. subscriber identification card) and transmission time in handset's memory unit for the next time an automatic query is performed, as shown in FIG. 4.

The mobile terminal equipment is provided with a software package that starts to transmit terminal subscriber information when the power is turned on and the software package may automatically or regularly transmit information to the mobile terminal service center without activation, and it simplifies subscribers' operation. The mobile terminal service center provides necessary services based on a supply-demands service agreement. The software module that works only after registration and activation by the mobile terminal service center is manually registered by the subscriber and there is an interactive interface. With this software, the subscriber may manually select the required contents of value-added services and set the short message number or special service number for receiving the terminal subscriber information and the information may be transmitted to the mobile terminal equipment service center in form of a command or other forms. If the mobile terminal equipment fails to transmit the information to the mobile terminal service center due to incorrect settings, (e.g. incorrect input of the short message center number), the mobile terminal equipment will automatically prompt or periodically prompt subscribers with the error information on a human-machine interface.

The automatic terminal subscriber information transmission software package the with special service number of mobile terminal equipment service center built-in and the terminal subscriber information is transmitted to the mobile terminal equipment service center as per the special service number. If the special service number is changed, the mobile terminal equipment service center will, in advance, update said software package, (i.e. changing it to a new special service number) online or in another effective way. This service center has the special service number used to communicate with the mobile terminal equipment and is able to modify the special service number.

The automatic terminal subscriber information transmission software package may contain the software upgrade module and, based on the features of the mobile terminal, it may set and determine the software upgrade protocol. On the basis of the protocol, the mobile terminal equipment service center may upgrade the application software of the mobile terminal equipment, e.g. upgrade of handset's game software.

The mobile terminal equipment may be of machine-card separation type or machine-card not-separation type.

The mobile terminal equipment, also referred to as a mobile station, refers to mobile telecom terminal equipment of various systems and standards (GSM (Global System for Mobil)/GPRS/EDGE/WCDMA/CDMAIS95/ CDMA1XRTT/CDMA2000/TD-SCD MA) such as handsets, PDAs, dual-mode handsets, group mobile phones, local wireless telephones, PHS terminals, IP (internet protocol) handsets, mobile telecom function-built GPS (global position system) terminals, portable computers, vehicle-carried computers and they are loaded with the terminal subscriber information transmission software package and modules to provide respective functions.

Embodiment 2

The mobile terminal equipment value-added services access system is mainly implemented by the mobile terminal equipment service center and it consists of a data processing part, a subscriber database and a value-added service interface. The data processing part is used for information reception and transmission, data parsing, interfacing to a database, data querying, comparison and processing of data, settings of rights, and input of the subscriber's basic data. The subscriber database is mainly used for the interface between the data storage and data processing part and for providing of data. The value-added service interface is mainly for connection with subscribers' ERP or CRM and provision of the subscriber-related data. It is designed to integrate, receive, analyze, process and store the combined information, providing the manufacturers, operators and content providers their required model of mobile terminal equipment, the subscribers number, subscriber's equipment-purchase date and equipment's running state and solving their problems in management, business and meeting clients' demands due to lack of above information.

When the mobile terminal equipment service center receives the terminal subscriber information transmitted in accordance with the protocol from the mobile terminal equipment to its special service number, it will parse the information in accordance with the protocol, classify, process and store the parsed data, and conduct management, statistics and survey of the mobile terminal equipment.

For example, when the mobile terminal service center receives subscriber information from a handset, it will compare the parsed data with the data in the previous database. If there is no identical electronic serial number and terminal subscriber identity code (phone number) in the database, it will take this subscriber as a new subscriber and store the information in the database. The stored information includes the electronic serial number, phone number, information-receive time, short message center number, and the information of registration place in the subscriber identification card. If there are identical electronic serial numbers in the database, but their terminal subscriber identity codes (phone numbers) are different, the system will deem the information abnormal, which is attributed to the following three possible cases. First, the previous subscriber lost his handset or his handset was stolen; second, the previous subscriber exchanged the handset with his family members or friends; or the third, the one who last transmitted the message is not the actual subscriber. Hence, the system will record the information in a red list for inquiry of the previous handset owner. In case of a report of loss, the system will have the information on a dark list, or will conduct manual visit and confirmation via CTI. An identical terminal subscriber identity code (phone number), but different electronic serial numbers would be attributed to the following cases: first, the subscriber changes his handset and will certainly not report the case; second, the original handset is lost or stolen and the previous owner has no option but to buy a new one. Hence, the system will select CTI to manually call subscriber's phone number and solve subscriber's problems in the event of handset-theft.

The mobile terminal equipment service center is also provided with an information receive-transmission interface, or built-in value-added service content, connected with related value-added services providers through interface configuration, or connected with EIR (equipment identity register) and HLR/AUC (home location register/authentication center) of the network operators' system to exchange information, process the information, store the information in the database that is used as an access platform for value-added services providers or is directly provided to value-added services.

The mobile terminal transmits the information to the special service number of mobile terminal equipment service center and the center may simultaneously receive information from or transmit information to one or more mobile terminals. The mentioned terminal subscriber information includes any one or any combination of two or more of the followings: the electronic serial number, Email address, IP (internet protocol) address, terminal subscriber ID (identification), network ID (identification), short message center number, and the information of registration place in the subscriber identification card.

According to the information transmitted from the mobile terminal equipment, the mobile terminal equipment service center may retrieve the type, manufacturer, and production electronic serial number of the mobile terminal from the electronic serial number, retrieve the phone number or other different addresses of information transmission from the terminal subscriber identity code, retrieve the registered operator from the network ID (identification), and retrieve the registration area of the subscriber from the short message center number and the registration place in subscriber identification card and according to the type of mobile terminal equipment, the functions and performances of the product can be retrieved. In some countries, the mobile terminal equipment service center may retrieve the registration address of both the operator and the subscribers from the phone number. Through analysis of the information transmitted from the mobile terminal equipment, the information-transmission time and related input data (e.g. function, performance, sales data, and information that is missing for the corresponding type of product) with data processing software, product sales, post-sales services, and access of value-added services for the product is provided.

Figure 5:
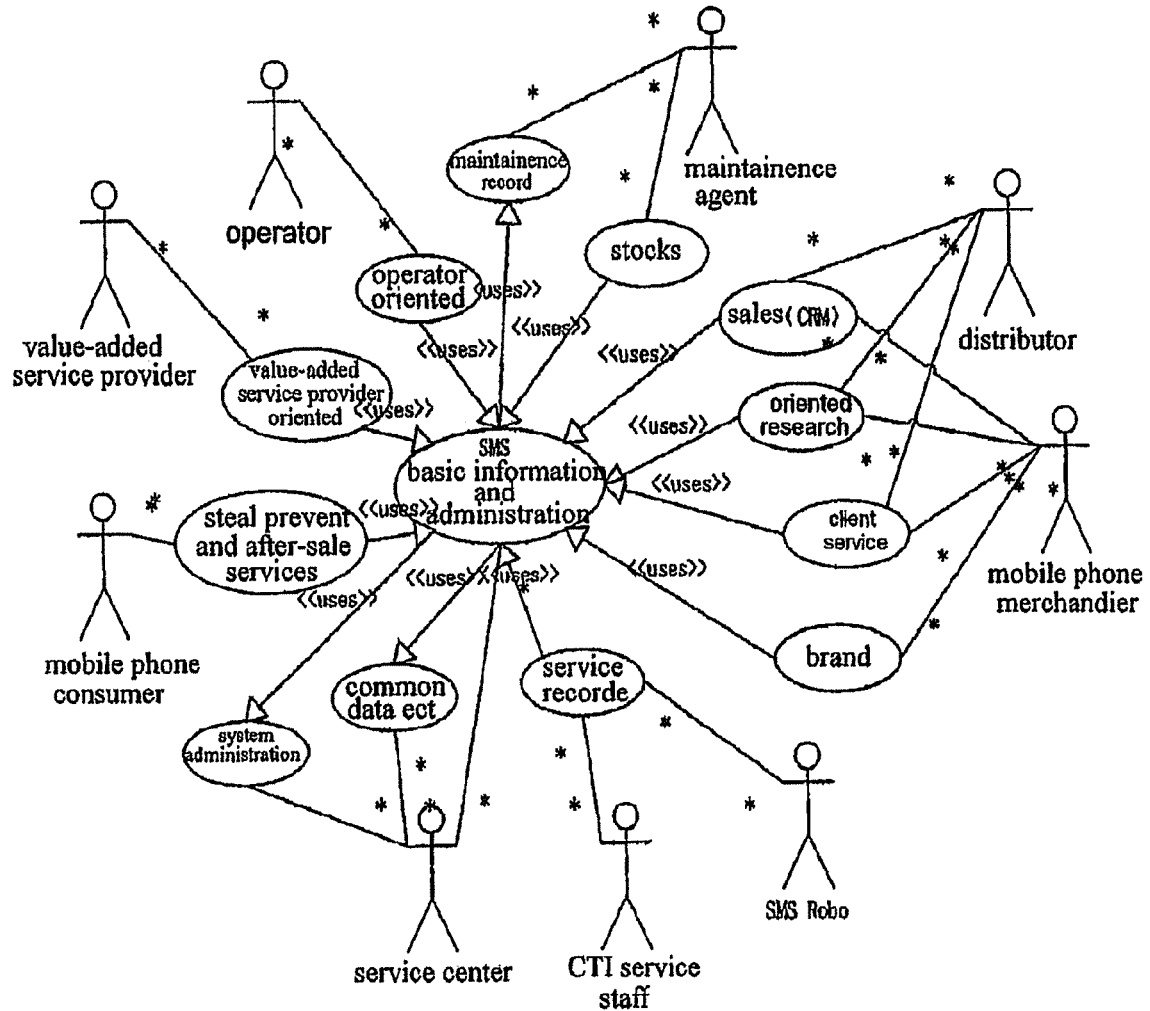
FIG. 5 is the association diagram of the mobile terminal equipment service center software.

For example, on the basis of the electronic serial number and information-transmission time of the sales volume of a given product within a given period may be determined. On the basis of the electronic serial number, information-transmission time, short message center number, the information of registration place in the subscriber identification card, or the phone number, a registration place may be directly retrieved. Information on sales performance of a given type of handset in a given region and during a given period, the regional cultural and living standards, and the inventories of spare parts necessary for maintenance may be obtained, on basis of the type electronic serial number, pipelining number, information-transmission time, short message center number or information of registration place in subscriber identification card distributors' cross-purchase and sales rate can be monitored. On the basis of the type of electronic serial number, terminal subscriber identity code (phone number) and normally-received regular information, statistics of service lifetime, quality and subscriber's satisfaction of a given type of handset, and on basis of the type of electronic serial number and terminal subscriber identity code (phone number) may be logged. Many problems in value-added services, post-sales services and high complaint rate of a personalized handset may be solved, as shown in FIG. 5. It should be understood that the examples above are merely for explanation of the present invention and do not restrict the scope of the present invention. Many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. An automatic identification system of mobile terminal equipment, which consists of the mobile terminal equipment, mobile network communication platform and mobile terminal equipment service center said mobile terminal equipment is provided with subscriber information handling means for transmitting terminal subscribers information to mobile terminal service center through communication channels of the mobile network communication platform, and said mobile terminal equipment service center compares said terminal subscriber information with that in its database: and then identifies and processes said terminal subscribers information; wherein: said terminal subscriber information includes the electronic serial number, terminal subscriber identification, terminal software version number and any one or any combination of two or more of the followings: network identification, base station number, short message center number, Email address, internet protocol address and the information of registration place in subscriber identification card.

2. The automatic identification system of mobile terminal equipment of claim 1, wherein upon power on or under specific conditions, said terminal subscriber information handling means automatically detects at least one of a subscriber identification module and a user identification module card and compares the at least one of the subscriber identification module and the user identification module number or terminal phone number with that in terminal memory unit stored during last transmission; if the detected at least one of the subscriber identification module and the user identification module is different from the one in said terminal memory unit, said terminal subscriber information handling means will automatically transmit the terminal subscriber information of the mobile terminal equipment and store the same in said mobile terminal memory unit.

3. The automatic identification system of mobile terminal equipment of claim 1, wherein upon power on or under specific conditions, said terminal subscriber information handling means automatically detects the local public mobile network number or base station number, and compares it with the public mobile network code stored in said mobile terminal equipment; if there is such mobile network code stored in said mobile terminal equipment, said terminal subscriber information handling means will detect at least one of a subscriber identification module and user identification module and compare the at least one of the subscriber identification module and user identification module number or terminal phone number with that in terminal memory unit stored during last transmission; if the detected at least one of the subscriber identification module and user identification module is different from the one in said terminal memory unit, said terminal subscriber information handling means will transmit the terminal subscriber information of the mobile terminal equipment to the mobile terminal service center of the corresponding special service number according to the local public mobile network code or base station number legally used and store the same in said mobile terminal memory unit.

4. The automatic identification system of mobile terminal equipment of claim 1, wherein said terminal subscriber information handling means automatically or regularly work without activation, or may work only after registration and activation by the mobile terminal service center, or may be manually operated by the terminal subscriber at any time.

5. The automatic identification system of mobile terminal equipment of claim 4, wherein said terminal subscriber information handling means is provided with subscriber manual-operated means in a form of command embedded into the terminal human-machine interface, for setting the short message number or special service number for receiving the terminal subscriber information by the subscriber; in case of failing to transmit the information to the mobile terminal service center due to incorrect settings, the mobile terminal equipment will make proper prompts.

6. The automatic identification system of mobile terminal equipment according to claim 1, wherein said terminal subscribers information is transmitted in forms of data, comprising at least one of short message service, multimedia messaging service, electronic mail system, unstructured supplementary service data, WEB, wireless application protocol, E-mail, short range wireless distance communication, infrared, internet, wireless-internet.

7. The automatic identification system of mobile terminal equipment according claim 1, wherein, wherein said communication channels of the mobile network communication platform are service channel, signaling channel or auxiliary channel.

8. The automatic identification system of mobile terminal equipment according to claim 1, wherein said electronic serial number of the mobile terminal equipment is one or any combination of the following:
   a) international mobile phone equipment identity number, that uniquely denotes the type, technical features and ex-work serial number of the mobile terminal equipment;
   b) the electronic number uniquely denotes the type, technical features and ex-work serial number of the mobile terminal equipment set by mobile terminal service center;
   c) the electronic number uniquely denotes the type, technical features and ex-work serial number of the mobile terminal equipment set by enterprise.

9. The automatic identification system of mobile terminal equipment of claim 8, wherein said International mobile phone equipment identity is the International Mobile Equipment Identification of a Global System for Mobil.

10. The automatic identification system of mobile terminal equipment of claim 8, wherein said International mobile phone equipment identity is the Electronic Serial Number of a code division multiple access system.

11. The automatic identification system of mobile terminal equipment of claim 1, the mobile terminal equipment sets one or several special service numbers and each special service number corresponds to one of the local public mobile network number, internet protocol address or E-mail address, which is assigned by local mobile operators or the mobile terminal equipment service center; the special service number may be modified, added or deleted by the mobile terminal equipment service center through the mobile network.

12. The automatic identification system of mobile terminal equipment of anyone of claim 1, wherein the mobile terminal equipment, denotes handset, personal data assistant, dual-mode handset, group mobile phone, local wireless telephone, personal handy-phone system terminal, internet protocol handset, mobile telecom function-built global position system terminal, portable computer, vehicle-carried computer, as well as the 3C electronic consumer products and household electric appliances providing wired or wireless communication connection for the above-mentioned terminal equipment.

13. A mobile terminal equipment value-added services access system, wherein the mobile terminal equipment service center is provided with one or more special service numbers used to communicate with the mobile terminal equipment; the mobile terminal service center registers the terminals and subscribers and stores the information in the database for provision of corresponding value-added services; the mobile terminal equipment service center is equipped with an information receive-transmission interface, information processing means, information storage database with built-in value-added service contents; through interface configuration said database is connected with at least one of related value-added services providers, or an equipment identity register, a home location register, and an authentication center of the network operators system for exchanging and processing the information and storing said information in the database that is used as the access platform for value-added services providers or is directly provided to the value-added services, wherein said terminal subscriber information includes the electronic serial number, terminal subscriber identification, terminal software version number and any one or any combination of two or more of the followings: network identification, base station number, short message center number, Email address and the information of registration place in subscriber identification card.

14. The mobile terminal equipment value-added services access system of claim 13, wherein the mobile terminal transmits the information to the special service number of mobile terminal equipment service center and the mobile terminal equipment service center simultaneously receives information from and transmits information to multiple mobile terminal equipment.

15. The mobile terminal equipment value-added services access system of claim 13, wherein said information processing means retrieves the terminal subscriber information from the received information sent by the mobile terminal equipment in accordance with the protocol format, compares the information with that in said database, and compares and processes the corresponding data in the database; for the processed data, the database management means will optimizes management and storage of the valid data according to the requirements and structure; it extracts or processes the historical data or connects database, or transmits the command, application software, services and related information individually or in group through the mobile network communication platform to the mobile terminal equipment according to the requirements of mobile network operators, mobile equipment terminal providers or other value-added services providers; said terminal subscriber information includes any one or any combination of two or more of the followings: electronic serial number, terminal subscriber identity code, network identification, short message center number and information of registration place in subscriber identification card.

16. The mobile terminal equipment value-added services access system of claim 13, wherein the mobile terminal service center compares the received terminal subscriber information with the corresponding data in the database and notifies the suspicious subscribers in forms of data, short message service, multimedia messaging service, electronic mail system or voice.

* * * * *